United States Patent [19]

D'Arcangelis

[11] 4,075,566
[45] Feb. 21, 1978

[54] CO-CHANNEL INTERFERENCE SUPPRESSION APPARATUS

[75] Inventor: Timothy D'Arcangelis, Oakdale, N.Y.

[73] Assignee: CATV Components Co., Stony Brook, N.Y.

[21] Appl. No.: 461,155

[22] Filed: Apr. 15, 1974

Related U.S. Application Data

[63] Continuation-in-part of Ser. No. 239,697, March 30, 1972, abandoned.

[51] Int. Cl.² .............................................. H04B 1/10
[52] U.S. Cl. ..................................... 325/369; 325/476
[58] Field of Search ............... 325/366, 367, 369, 371, 325/65, 476; 343/112 D, 854

[56] References Cited

U.S. PATENT DOCUMENTS

| | | | |
|---|---|---|---|
| 2,854,568 | 9/1958 | Lewin et al. | 325/367 |
| 3,167,761 | 1/1965 | LeParquier | 325/476 |
| 3,354,459 | 11/1967 | Schwartz et al. | 343/854 |

Primary Examiner—Robert L. Griffin
Assistant Examiner—Jin F. Ng

[57] ABSTRACT

The present invention refers to apparatus intended to suppress multiple co-channel interference and reflections from desired stations. The outputs of a two antenna array, which has been directed at the desired station, are fed to a sum-and-difference hybrid. The outputs of the hybrid are adjusted in amplitude and phase and combined to null the interference signal. The phase shift required for nulling is either ±90°. The sign is determined by the side of the array on which the interference source is located. The phase relation is true regardless of the exact location of the interference, requiring only a single adjustment in amplitude to null the source of interference.

By adding a third antenna to the array and a phase detector to the system, a signal representing the direction of the source of interference is produced and is used to introduce either a ±90° phase shift and to set the required attenuation automatically cancelling the interference signal even if the interference signal source moves as effectively occurs with the resultant of multiple sources of interference.

3 Claims, 7 Drawing Figures

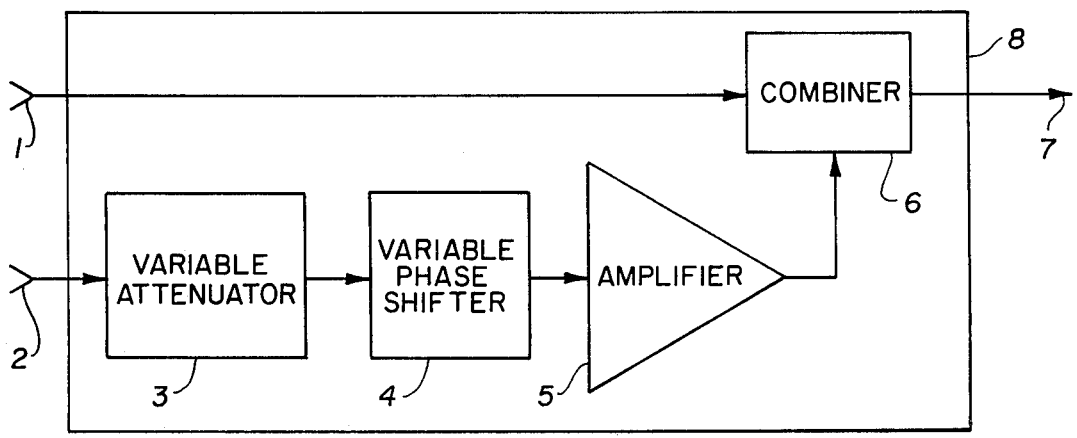
FIGURE 1
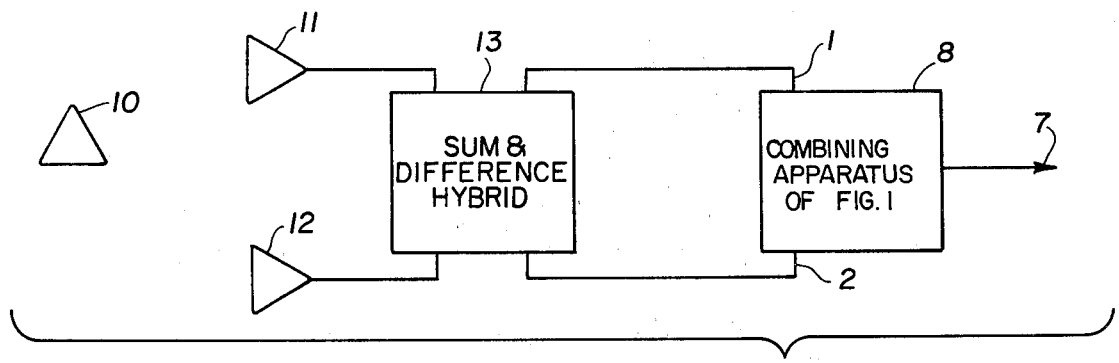
FIGURE 2
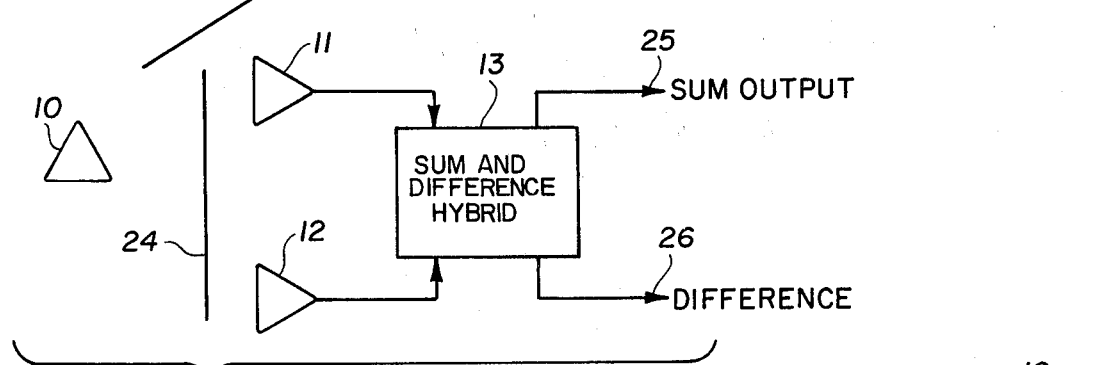
FIGURE 3
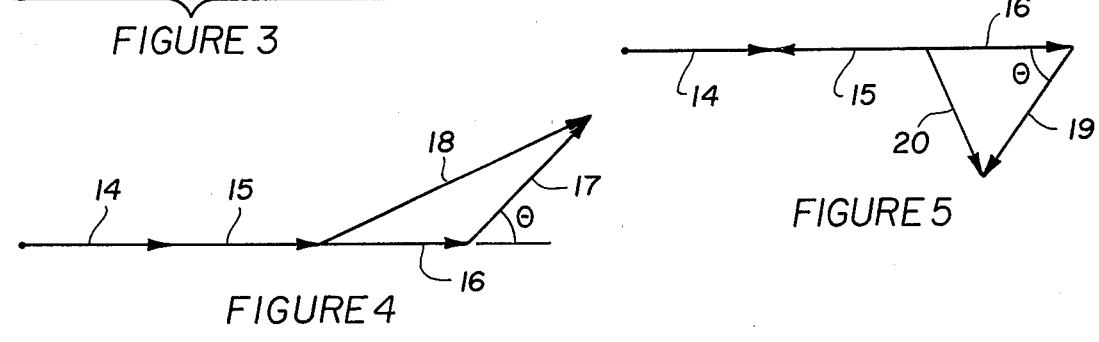
FIGURE 4
FIGURE 5

CO-CHANNEL INTERFERENCE SUPPRESSION APPARATUS

This application is a continuation in part of application Ser. No. 239,697, filed in the U.S. Patent Office on 3-30-72, now abandoned.

BACKGROUND OF THE INVENTION

1. Field of the Invention

Co-channel signals are the most difficult type of interference signals to remove as they occur on the same frequency as the desired signal and therefore are not amenable to conventional filtering techniques. The seriousness of the co-channel interference problem is heightened due to the fact that it is not restricted to receiving sites located at appreciable distances from two transmitters, but can be at any distance from a transmitting site due to the production of 'ghosts' or reflections of the desired signal from nearby obstructions which are in effect co-channel interference signals.

2. Description of the Prior Art

Prior art which is currently employed to reduce the effects of co-channel interference on television reception includes carrier beat note filters and antenna arrays.

Typical carrier beat note filters can attenuate the 10 to 20KHz beat frequency usually found between co-channel carriers, but such filters cannot eliminate the complete interference. For example, superimposed pictures are not eliminated by this technique.

Systems which use an auxiliary antenna directed at the interference signal source and adjust the phase and amplitude of the interference signal to cancel the interference signal received by the main array required skill in adjustment as both phase and amplitude controls must be adjusted simultaneously in order to null the interference. Only one setting for both controls will produce cancellation and this point must be found if any significant cancellation is to occur. The auxiliary antenna must be directed at the interference source requiring the operator to know the source of interference. If more than one independent source of interference exists, then multiple systems and antennas are required to eliminate the interference. These and other problems are overcome by the present invention.

SUMMARY

An object of the present invention is to provide a co-channel suppression apparatus in which the magnitude of an interference signal is attenuated with respect to a desired signal rendering the desired signal effectively separated from the inteference signal and thus usable for reception. This is achieved by receiving and processing the signals from two antennas in an array in which both antennas are directed at the desired signal source. The output signals from each of the two antennas is supplied to a sum and difference hybrid where the two signals are vectorially added and subtracted. The output signal from the sum port of the hybrid contains the desired signal and a component of the interference signal, while the output from the difference port contains only a component of interference signal. The interfering signal component from the difference port is theoretically at a phase angle difference of ±90° with respect to the interference signal component from the sum port. By shifting the difference signal an additional 90° to be in phase opposition with the interference component in the sum channel, and adjusting the difference signal amplitude to equal the magnitude of the interference component in the sum port, the two signals may then by combined to cancel the interference signal components. In a field installation of this system cancellation can be achieved by simply adjusting the amplitude controls. The only adjustment of the phase control is switching in a positive or negative 90° phase shift.

This system is made automatic by adding a third antenna and a phase detector. The output of the phase detector is a signal which corresponds to the direction of the interference source. With this signal the required attenuation and fixed positive or negative 90° phase shift is automatically switched in to cancel the interference system. The response of the automatic system can be made sufficiently fast to adjust for the movement of a single interference source or for the apparent movement of a single resultant source produced by multiple nonsynchronous interference sources regardless of their location.

BRIEF DESCRIPTION OF THE DRAWINGS

FIG. 1 is a block diagram of apparatus used to vary the phase and magnitude of one signal prior to combining it with a second signal.

FIG. 2 is a block diagram of a system used to cancel interference combining a two antenna array a sum and difference hybrid and the apparatus shown in FIG. 1.

FIG. 3 shows the waves incident from the desired and interfering sources.

FIG. 4 is a vector diagram of the signals produced at the output of the sum port of a sum and difference hybrid a connected in the system shown in FIG. 2.

FIG. 5 is a vector diagram of the difference output of a sum and difference hybrid connected in the system shown in FIG. 2.

DETAILED DESCRIPTION OF THE INVENTION

Figure 6:
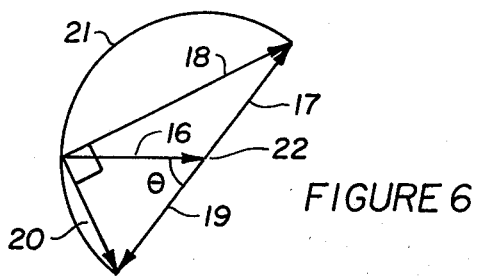
FIG. 6 is a vector diagram of the sum and difference interfering components.

In combining apparatus 8 of FIG. 1, the input part 1 is connected to the output port 7, through a combiner 6. A second input port 2 is connected to output port 7 through a variable attenuator 3, a variable phase shifter 4, an amplifier 5, and combiner 6. In the combining apparatus 8 of FIG. 1, a signal entering port 1 will be combined with a signal entering port 2 with both signals emerging at port 7. The signal entering port 2 can be adjusted in phase and amplitude as desired prior to combination by varying attenuator 3 and phase shifter 4. Attenuator 3 and phase shifter 4 may be manually or electronically operated. In this description attenuator 3 and amplifier 5 are considered as a single element referred to simply as an attenuator which permits the amplitude of the signal output of amplifier 5 to be varied above or below the level of the input signal at port 2.

The combining device can be a directional coupler or 3db hybrid or other device commonly used to combine electrical signals.

The purpose of combining apparatus 8 is to simply vary the amplitude and phase of one signal with respect to the other and therefore an equivalent circuit can be constructed by placing any or all of the phase shifting and attenuating elements in the line connecting port 1 with combiner 6.

In the signal cancellation system of FIG. 2, a two antenna array consisting of antennas 11 and 12 are directed at desired signal source 10. These antennas also receive a signal at any angle off boresight from interference source 9. Antenna 11 and 12 are connected to the input ports of sum and difference hybrid 13 which takes the vectorial sum of the input signals and produces it at one output port termed the sum port and produces the vectorial difference at a second output port termed the difference port. The output from the sum port is connected to input port 1 of combining apparatus 8 while the difference port is connected to combining apparatus input port 2.

The term two antenna array is used to describe an array with two outputs which provide at each output, signals of equal levels from sources in all directions but equal in phase only for a source on boresight or 180° from boresight. This type of antenna normally contains elements spaced from each other horizontal.

When two antennas are directed at a desired station and the outputs of these antennas are fed to a sum and difference hybrid, the output from the hybrid sum port will be the desired signal plus a component of the co-channel interference signal, while the output from the difference port will be only the co-channel interference signals because the desired signal is received with equal magnitude and phase on both antennas and when subtracted produces zero output at the difference port. The co-channel interference signal from the difference port can be used to cancel the co-channel signal from the sum port leaving the desired signal free of interference. The co-channel signal component in the difference port will always be plus or minus 90 degrees away from the co-channel signal component in the sum port making it possible to provide a fixed phase ± 90° relationship in the combining apparatus 8 for cancellation of the co-channel component. Only the amplitude controls need be varied to effect cancellation for either the plus or minus 90 degree setting. The direction of the co-channel signal need not be known because no matter what the direction, some attenuator setting can be found to cancel the co-channel component. The attenuator setting may be found by merely sequentially stepping through the attenuator controls.

If multiple reflections are produced by a single source, they will add and produce effectively a single vector which acts as a single co-channel source. This effectively single co-channel source can be eliminated as any other single source of interference.

The phase relationship between signals received on and off boresight can be seen with the aid of FIG. 3. If a desired station is located on boresight, its wave front 24 will be received by both antennas of the main array simultaneously. These will be a zero difference in phase between the desired signal received on antennas A and B. The interference source is located off boresight causing its wave front 23 to be intercepted by antenna 11 and then later by antenna 12. The time delay in interception represents a phase difference between the interference signal received on antennas 11 and 12.

The signal received on antennas 11 and 12 are fed to a sum and difference hybrid 13 as shown in FIG. 3 where they are vectorally added and subtracted. The vector addition of the signals obtained from the sum port 25 of hybrid 13 is shown in FIG. 4, while the difference is shown in FIG. 5. The signal strength of each received signal component is represented by a vector. In FIGS. 4, 5 and 6 all the desired and interference vectors are shown as being of equal length for convenience. The only assumption really necessary, is that antenna A and B have equal gain and received all signals from the same direction with approximately equal strength. Therefore, the interference vectors could be larger than the desired signal vector or the opposite may be true as long as the two desired signal vectors are of the same strength and the two interference vectors are of the same strength.

In FIG. 4 the two desired signals 14 and 15 add together to give the sum of the desired signals received. The interference signal 16 received on antenna 11 is arbitrarily shown to be in the same direction as the desired signals. The interference signal 17 received on antenna 12 is shown shifted by a phase angle $\theta$. Vector 18 is the resultant interference vector.

FIG. 5 shows the output from the difference port of the hybrid 13. The desired signals are in opposite directions indicating cancellation of the desired signal in the difference port. There is therefore only an interference signal in the difference port. This interference signal is made up of the interference signal on antenna 11 and the interference signal 17 from antenna 12 reversed in direction to indicate subtraction and shown as vector 19 in FIG. 5. The vector 20 pointing downward is the resultant of the difference of the interference signals.

The relationship between the sum and difference port interference vectors is shown in detail in FIG. 6. Interference vectors 16 and 17 represent the sum port interference output while interference vector 16 and the reverse of interference vector 17 shown as vector 19 represent the difference port output. By noting that interference vectors 16, 17, and 19 are equal in length, it can be seen that these vectors describe a semicircle in which interference vector 16, 17, and 19 represent the radii of the semicircle. The resultant vectors 18 and 20 always describe a right angle within this semicircle. As shown in FIG. 6 a positive 90° must be added to vector 20 for it to be in opposition with vector 18. When the interference is on the opposite side of boresight, $\theta$ exceeds 90° and the resulting vector diagram will require a $-90°$ to be inserted for cancellation. However, one fixed value of either plus or minus 90° may be inserted for the interference on one side of boresight. Since the desired signal is cancelled in the difference port output and the remaining signal is only a resultant interference vector which is always at a phase angle of ±90° with respect to the interference vector in the sum port output, it is possible to shift the difference interference vector ±90°, adjust it in amplitude to equal the sum interference vector and use it to cancel the sum interference vector, thereby producing a sum signal free of interference. The required phase shift and adjustment in amplitude of the difference interference signal as well as the combination of this adjusted signal with the sum signal required for cancellation of interference is accomplished in combiner apparatus 8 by supplying the sum signal from hybrid 13 to port 1 of combiner apparatus 8 and the difference signal to port 2. Since there is a fixed 90° relation between the two interference resultants, the phase shifter 4 in combiner apparatus 8 is set to a fixed value corresponding to either ±90° depending on which side of boresight the interference is located. Then only the level controls need be varied sequentially to find the point of cancellation as described earlier.

The assumption that the interference signals received or antennas 11 and 12 are equal is not always true because of masking and signal such out, but for most cases it is a reasonable approximation. Usually any error in this approximation can be corrected by a small adjustment in a variable phase shifter which is a part of phase shifter 4.

Figure 7:
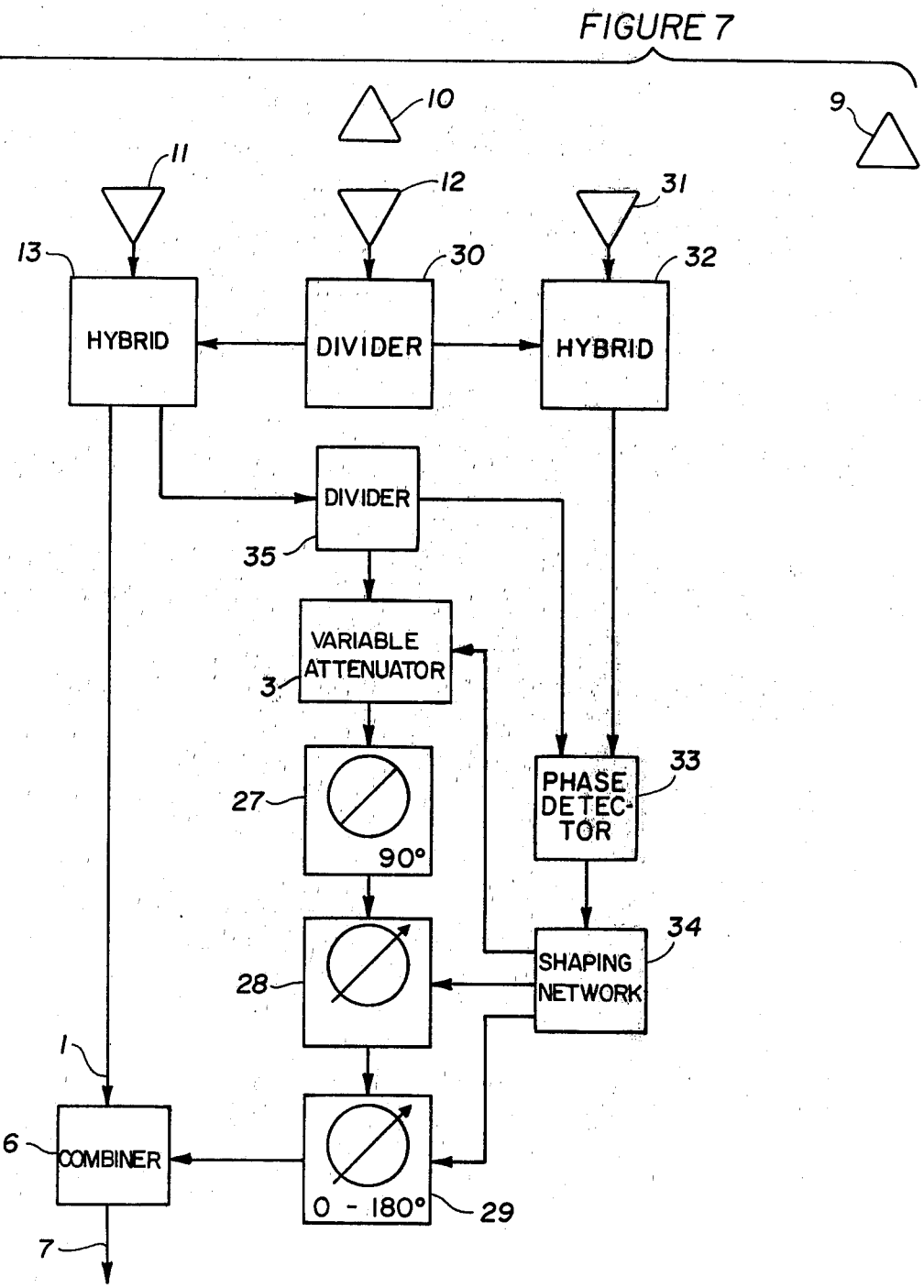
FIG. 7 is a block diagram on an automated system used to cancel interference which includes the essential features of the system shown in FIG. 2.

In the automatic system of FIG. 7, the output of antenna 12 passed through divider 30 to supply hybrid 13 and hybrid 32. Hybrid 32 also receives an input from a third antenna 31 directed at the desired source 10. Hybrid 13 receives an input from antenna 11 and supplies the sum output directly to combiner 6 and the difference output through divider 35, electronically controlled attenuator 3, 90° phase shifter 27, variable phase shifter 28 and switchable 180° phase shifter 29 to combiner 6. The second output of divider 35 supplies a portion of the difference from hybrid 13 to phase detector 33. The difference output of hybrid 32 is also supplied to phase detector 33. The output of phase detector 33 is supplied to shaping network 34 where the phase detector output is converted to control signals for attenuator 3, and phase shifter 28 and 29. Dividers 30 and 35 are presummed to have no loss which can be accomplished in practice by incorporating an amplifier in each divder. Another assumption is that there is no relative phase shift through the interconnection of elements or in the elements themselves except for the phase shifter. This assumption can also effectively be realized in practice by inserting compensating phase shifts as necessary.

Phase shifter 27 is a fixed 90° phase shift while phase shifter 29 switches in or out of the circuit 180° of phase shift on command. These two phase shifters in combination provide either a ±90° phase shift. Phase shifter 28 is a variable phase shift used to compensate for imperfections which require some trim about 90° for cancellation. In the automatic interference cancelling system shown in FIG. 7, the basic operation is the same as the system shown in FIG. 2. Antennas 11 and 12 supply signals to hybrid 13 which in turn supplies the sum output signal to combiner 6 directly and the difference output through attenuator 3 and a phase shifter prior to delivery to the combiner 6. Phase shifter 27, 28, and 29 merely present in greater detail, one embodiment of phase shifter 4 shown in FIG. 1. The phase shifter and attenuator are again adjusted to effect cancellation of the interference signal components in combiner 6, however, this is done automatically.

The principal difference between the automatic system of FIG. 7 and the manual system of FIG. 2 is in the means by which the attenuator and phase shifter are set to the correct values to effect cancellation. The correct value for the attenuator and the phase shifter are a direct function of the relative position of the interference source 9 with respect to the boresight of antennas 11 and 12. This can be seen by noting that resultants 18 and 20 in FIG. 6 vary as a function of ζ which is related to the angle the interference source makes with the antenna boresight and the fixed antenna spacing. By adding a third antenna 31 directed at the desired signal source 10 and a second hybrid 15, two hybrid difference output signals may be obtained. These difference signals contain only components of the interference signal. The phase angle between these difference signal is related to the direction of the interference source 9 and can be placed through a shaper network 34 to convert the phase detected output signals to the required control signal to set the electronically controlled attenuator and phase shifter for interference cancellation.

The required transfer functions of the shaping network is a function of the transfer functions of the phase detector and the phase shifters and attenuator. This can be found experimentally by moving an interference source about the antenna noting the required control signals for cancellation and the phase detector output.

The values required can be theoretically predicted from the vector diagram of FIG. 6 and only minor variations need be made to account for anomalies at a particular site.

The automatic system FIG. 7 can be used to cancel multiple sources of interference simultaneously. Multiple phase locked sources such as ghosts produced by a single source can be added to form a single equivalent source located at one point and the signal from this equivalent source may be cancelled as any other single source of interference. When multiple interference sources are not phase locked, the location of the equivalent source moves from point to point, however, at any instant in time the equivalent source is located at one point and may be cancelled at that point. As long as the response of the phase detector, shaping network, attenuator and phase shifter are as fast as the change in location of the equivalent source, cancellation will occur. The change in location is a function of the rate of change in phase between the signals. Television stations for example are only 10KHz apart and effective change in location caused by this frequency difference can be accomplished with currently available hardware.

Interference sources on the same bearing as the desired source cannot be accommodated by this system unless the receiving signal is changed to cause the interference site to be on a different bearing. An interference source bearing 180 degrees from the desired also cannot be cancelled by this system however, an auxiliary antenna directed at the undesired signal source in combination with the cancellation apparatus of FIG. 1 will cancel an interference source on this bearing.

I claim:
1. Apparatus to suppress an interference signal on the same frequency as a desired signal, comprising:
    a) a sum and difference hybrid having a first and second input port and two output ports, one a sum port and the other a difference port, the first and second input ports receiving signals from a first and second antenna respectively of a two antenna array directed at the desired signal source,
    b) a combiner having a first and second input port and one output port the first input port of the combiner being connected to the hybrid sum port and the second input port of the combiner being connected to the hybrid difference port,
    c) means for introducing a change in amplitude in the signal from one of the output ports of the hybrid to permit the interference signal component of said signal from the hybrid to be made equal in magnitude to the interference signal component of the signal from the other output port of the hybrid, and
    d) means for introducing a change in phase of substantially 90° in one of the output signals from the hybrid to permit the interference component of that signal to be placed in phase opposition with the interference component of the other output signal from the hybrid to produce cancellation of the interference signal components when the hybrid output signals are added in the combiner, said means for introducing a change in phase includes a variable phase shifter, a fixed 90° phase shifter, a switchable 180° phase shifter in series with the 90° phase shifter to produce in combination a plus 90° total phase shift when the 180° phase shifter is switched out of the circuit and a −90° phase shift when the 180° phase shifter is switched into the circuit.

2. Apparatus as claimed in claim 1, wherein said means for introducing a change in amplitude is an electronically controlled attenuator.

3. Apparatus as claimed in claim 2 further comprising
   a) a second sum and difference hybrid having a first and second input ports and two output ports, one output port being a sum port and the other a difference port, said second hybrid receiving at its first input port a signal from said second antenna and at its second input port a signal from a third antenna that is directed at the desired signal source and separated from the first two antennas in the horizontal plane,
   b) a phase detector having a first and second input ports and an output port, said phase detector receiving at its first and second input ports signals from the difference outputs of the first and second hybrid respectively to produce at the output port of the phase detector a signal
   corresponding to the phase difference between the interference signal components from the hybrid difference ports and thus a signal corresponding to the direction of the source of interference signal with respect to the direction of the antenna array.
   c) a shaping network having an input port and three output ports, said output ports, being connected to the electronic control input ports of the electronically controlled attenuator, switchable 180° phase shifter and variable phase shifter respectively, said shaping network adjusted to convert the output signal produced in accordance with the transfer function of the phase detected signal to the output control signals determined by the transfer function of the electronic phase shifter and attenuator to cancel the interference component in the output of the combiner.

* * * * *